US012630667B2

(12) United States Patent
Liu et al.

(10) Patent No.: US 12,630,667 B2
(45) Date of Patent: May 19, 2026

(54) MODIFIED POLYISOCYANATE

(71) Applicant: Covestro Deutschland AG, Leverkusen (DE)

(72) Inventors: Hao Liu, Shanghai (CN); Yaguang Ma, Shanghai (CN); Na Xu, Shanghai (CN); Tian Xia, Shanghai (CN); Hans-Josef Laas, Odenthal (DE); Raul Pires, Cologne (DE)

(73) Assignee: Covestro Deutschland AG, Leverkusen (DE)

( * ) Notice: Subject to any disclaimer, the term of this patent is extended or adjusted under 35 U.S.C. 154(b) by 533 days.

(21) Appl. No.: 18/044,460

(22) PCT Filed: Sep. 29, 2021

(86) PCT No.: PCT/EP2021/076827
§ 371 (c)(1),
(2) Date: Mar. 8, 2023

(87) PCT Pub. No.: WO2022/069561
PCT Pub. Date: Apr. 7, 2022

(65) Prior Publication Data

US 2024/0301122 A1 Sep. 12, 2024

(30) Foreign Application Priority Data

Sep. 30, 2020 (CN) ......................... 202011069929.1
Nov. 18, 2020 (EP) ..................................... 20208306

(51) Int. Cl.
*C08G 18/78* (2006.01)
*C08G 18/02* (2006.01)
*C08G 18/08* (2006.01)

(52) U.S. Cl.
CPC ....... *C08G 18/7887* (2013.01); *C08G 18/022* (2013.01); *C08G 18/0828* (2013.01); *C08G 2150/00* (2013.01); *C08G 2170/00* (2013.01)

(58) Field of Classification Search
CPC .............. C08G 18/7887; C08G 18/022; C08G 18/0828; C08G 2150/00; C08G 2170/00; C08G 18/62; C08G 18/706; C08G 18/792; C08G 18/807; C09D 175/04
See application file for complete search history.

(56) References Cited

U.S. PATENT DOCUMENTS

| | | | |
|---|---|---|---|
| 3,996,223 | A | 12/1976 | Gupta et al. |
| 4,255,569 | A | 3/1981 | Mueller et al. |
| 4,837,359 | A | 6/1989 | Woynar et al. |
| 4,960,848 | A | 10/1990 | Scholl et al. |
| 4,994,541 | A | 2/1991 | Dell et al. |
| 5,064,960 | A | 11/1991 | Pedain et al. |
| 5,076,958 | A | 12/1991 | Pedain et al. |
| 5,098,983 | A | 3/1992 | Mosbach et al. |
| 5,334,637 | A | 8/1994 | Zwiener et al. |
| 5,473,011 | A | 12/1995 | Laas et al. |
| 5,914,383 | A | 6/1999 | Richter et al. |
| 6,090,939 | A | 7/2000 | Richter et al. |
| 6,426,414 | B1 | 7/2002 | Laas et al. |
| 7,641,975 | B2 | 1/2010 | Fischer et al. |
| 2004/0034162 | A1 | 2/2004 | Laas et al. |
| 2007/0104962 | A1 | 5/2007 | Laas et al. |
| 2010/0183883 | A1 | 7/2010 | Schaefer et al. |
| 2012/0041142 | A1 | 2/2012 | Nennemann et al. |
| 2012/0101210 | A1 | 4/2012 | Nennemann et al. |
| 2016/0280836 | A1 | 9/2016 | Ji et al. |
| 2019/0330408 | A1 | 10/2019 | Laas |
| 2019/0330409 | A1 | 10/2019 | Laas |

FOREIGN PATENT DOCUMENTS

| | | | |
|---|---|---|---|
| DE | 1954093 | A1 | 6/1970 |
| DE | 1670666 | A1 | 7/1971 |
| DE | 2414413 | A1 | 10/1975 |
| WO | 2008003282 | A1 | 10/2008 |
| WO | 2017154963 | A1 | 9/2017 |
| WO | 2020109189 | A1 | 6/2020 |

OTHER PUBLICATIONS

Machine Translation of EP 0962455 (Year: 1999).*
J. Prakt. Chem.336 (1994) 185-200, Abstract Only.
International Search Report for PCT/EP2021/076827 issued on Jan. 21, 2022 by Authorized officer “Lanz, Sandra”.

* cited by examiner

*Primary Examiner* — John M Cooney
*Assistant Examiner* — Adam J Berro
(74) *Attorney, Agent, or Firm* — The Webb Law Firm

(57) ABSTRACT

The invention relates to a modified polyisocyanate and use thereof, especially as a crosslinking component in a water-soluble or water-dispersible coating composition. The modified polyisocyanate comprises iminooxadiazinedione structure and isocyanurate structure, wherein the weight ratio of the iminooxadiazinedione structure to the isocyanurate structure is not less than 1:5; and relative to the total weight of the modified polyisocyanate, the total amount of molecules with a number average molecular weight greater than 2700 g/mol in the modified polyisocyanate is 4.1% by weight to 22% by weight; and the modified polyisocyanate is obtainable by the reaction of: an aminosulfonic acid, a polyisocyanate; a tertiary amine; and optionally a polyether alcohol containing ethylene oxide groups.

15 Claims, No Drawings

MODIFIED POLYISOCYANATE

CROSS-REFERENCE TO RELATED APPLICATIONS

This application is a national stage application under 35 U.S.C. § 371 of PCT/EP2021/076827, filed Sep. 29, 2021, which claims the benefit of Chinese Patent Application No. 202011069929.1, filed Sep. 30, 2020 and European Application No. 20208306.9, filed Nov. 18, 2020, each of which is incorporated herein by reference.

TECHNICAL FIELD

The invention relates to a modified polyisocyanate and use thereof, especially as a crosslinking component in a water-soluble or water-dispersible coating composition.

BACKGROUND

Due to the increasingly stringent environmental regulations in various countries, water-dispersible modified polyisocyanates have become more and more important in various applications in recent years. Water-dispersible modified polyisocyanates are often used as a crosslinking component for aqueous two-component coating compositions or aqueous dispersion adhesives and sealants. Water-dispersible modified polyisocyanates are used to crosslink an aqueous dispersion in textile finishing or formaldehyde-free textile printing inks. In addition, they may also be used as an additive for paper wet strengthening treatment (see, for example, EP-A0959087 and the references cited therein).

At present, water-dispersible modified polyisocyanates are roughly divided into two types: non-ionically modified polyisocyanates and ionically modified polyisocyanates. Non-ionic modified polyisocyanates, especially polyether-modified polyisocyanates are widely used, but they still have many disadvantages. For example, due to the high viscosity to be overcome during the dispersion, a considerable shear force (such as high-speed stirring) must be applied to make it evenly dispersed in the water. Further, for example, when such a polyether-modified polyisocyanate is used as a crosslinking agent in aqueous two-component coating compositions, a larger amount of polyether is generally introduced to achieve better dispersibility, which on one hand will permanently affect the water resistance of the formed coatings, and on the other hand, significantly reduces the concentration of the isocyanate groups in the polyether-modified polyisocyanate and reduce its crosslinking density.

In order to overcome the above shortcomings, attempts have been made to use ionically modified polyisocyanates.

For example, a water-dispersible polyisocyanate modified with carboxylic acid groups is obtained by using a carboxylic acid group-modified polyisocyanate (EP-A0443138, EP-A0510438 and EP-A0548669). The carboxylic acid group-modified polyisocyanate can be dispersed in water by stirring without high shear force but its storage stability is poor, especially after the carboxylic acid groups are neutralized. Moreover, since the carboxylate groups of the carboxylic acid group-modified polyisocyanate have a certain catalytic activity, the isocyanate groups in the carboxylic acid group-modified polyisocyanate start to polymerize at room temperature, for example, to trimerize to form a polyisocyanurate, giving an α-polyamide structure, which leads to the gelation and poor storage stability of the carboxylic acid group-modified polyisocyanate.

Another example is a water-dispersible polyisocyanate modified with sulfonic acid groups which is obtained from a sulfonic acid group-modified polyisocyanate. CN101754990A discloses a method for modifying polyisocyanate with 4-aminotoluene-2-sulfonic acid containing a benzene ring, and the water dispersibility of the resulting sulfonic acid group-modified polyisocyanate is better than that of the carboxylic acid group-modified polyisocyanate. However, the presence of the benzene ring therein reduces the yellowing resistance of the formed coating. CN1190450C discloses the use of 3-cyclohexylaminopropane-1-sulfonic acid and 2-(cyclohexylamino)-ethanesulfonic acid as a hydrophilic modifier, and of tertiary amine as a phase transfer catalyst and a neutralizer to prepare a modified polyisocyanate. CN104448232 discloses the use of 4-(cyclohexylamino)-butanesulfonic acid as a hydrophilic modifier and of tertiary amine as a phase transfer catalyst to prepare a modified polyisocyanate.

The above sulfonic acid group-modified polyisocyanate can be dispersed in water without high shearing force. However, in actual operation, it still needs for the operators to dilute the sulfonic acid group-modified polyisocyanate with a solvent to a concentration of 70-80% to reduce its viscosity, and then mix with other coating components, and manually stir for dispersing to obtain the coating. The addition of the solvent will significantly increase the VOC content of the coating composition, which is harmful to the environment and humans.

Therefore, there is a demand in the industry for a modified polyisocyanate that has good manual stirring behavior and dispersibility without diluting with a solvent.

SUMMARY OF THE INVENTION

The object of the present invention is to provide a modified polyisocyanate and use thereof, especially as a crosslinking component in a water-soluble or water-dispersible coating composition.

The modified polyisocyanate according to the present invention comprises an iminooxadiazinedione structure and an isocyanurate structure, wherein the weight ratio of the iminooxadiazinedione structure to the isocyanurate structure is not less than 1:5; and the total amount of molecules with a number average molecular weight greater than 2700 g/mol in the modified polyisocyanate is 4.1% by weight to 22% by weight, relative to the total weight of the modified polyisocyanate; and the modified polyisocyanate is obtainable by the reaction of:

a. at least an aminosulfonic acid;
b. at least a polyisocyanate;
c. at least a tertiary amine; and
d. optionally, a polyether alcohol containing ethylene oxide groups.

According to one aspect of the present invention a method for preparing a modified polyisocyanate according to the present invention, in which component a), component b) and optionally component d) are reacted in the presence of component c) to obtain a modified polyisocyanate is provided.

According to another aspect of the present invention, the use of the modified polyisocyanate according to the present invention as a starting component in the preparation of polyurethanes is provided.

According to another aspect of the present invention, the use of the modified polyisocyanate according to the present invention as a crosslinking component for water-soluble or water-dispersible coating compositions, adhesives or sealants is provided.

According to another aspect of the present invention, the use of the modified polyisocyanate according to the present invention as a starting component for preparing polyisocyanates blocked by a blocking agent is provided.

According to another aspect of the present invention, a coating composition, an adhesive or a sealant comprising the modified polyisocyanate according to the present invention is provided.

According to another aspect of the present invention, a substrate coated with the coating composition, the adhesive or the sealant according to the present invention is provided.

According to another aspect of the present invention, the use of the modified polyisocyanate according to the present invention for improving the manual stirring behavior of coating compositions, adhesives or sealants is provided.

According to another aspect of the present invention, the use of the modified polyisocyanate according to the present invention as a crosslinking component in a water-soluble or water-dispersible two-component coating composition is provided.

According to another aspect of the present invention, an aqueous two-component coating composition comprising at least an aqueous hydroxy resin dispersion, at least a modified polyisocyanate according to the present invention, optionally an auxiliary agent and optionally an additive is provided.

According to another aspect of the present invention, a method for preparing an aqueous two-component coating composition, which comprises the steps of: mixing an aqueous hydroxy resin dispersion and optionally an additive in any manner to obtain a mixture, mixing the modified polyisocyanate according to the present invention with the mixture, and manually stirring to obtain the aqueous two-component coating composition is provided.

According to another aspect of the present invention, a product which comprises a substrate and a coating formed by applying the aqueous two-component coating composition of the present invention to the substrate is provided.

According to another aspect of the present invention, a method for manufacturing a product, which comprises applying the aqueous two-component coating composition of the present invention to a substrate, and then curing and drying is provided.

The modified polyisocyanate of the present invention is water-soluble or water-dispersible, and can be directly mixed with other coating components without diluting with a solvent, and uniformly dispersed in the resin system by simply manually stirring to obtain a coating composition, and the coating formed by the coating composition has good gloss and transparency.

During the mixing and preparation of the coating, the adhesive or the sealant comprising the modified polyisocyanate of the present invention, it is unnecessary to add a solvent for dispersing the modified polyisocyanate. Therefore, the resulting coating composition, adhesive or sealant has a low VOC content.

Therefore, the present invention actually provides a modified polyisocyanate with good manual stirring behavior and good dispersibility, and the coating formed by the coating composition containing the modified polyisocyanate has high gloss and good transparency.

DETAILED DESCRIPTION

The present invention provides an modified polyisocyanate comprising an iminooxadiazinedione structure and an isocyanurate structure, wherein the weight ratio of the iminooxadiazinedione structure to the isocyanurate structure is not less than 1:5; and the total amount of molecules with a number average molecular weight greater than 2700 g/mol in the modified polyisocyanate is 4.1% by weight to 22% by weight, relative to the total weight of the modified polyisocyanate; and the modified polyisocyanate is obtainable by the reaction of:

a. at least an aminosulfonic acid;
b. at least a polyisocyanate;
c. at least a tertiary amine; and
d. optionally, a polyether alcohol containing ethylene oxide groups.

The invention also provides a method for preparing the modified polyisocyanate; and use of the modified polyisocyanate in the preparation of polyurethanes or of polyisocyanates blocked by a blocking agent, in the preparation of water-soluble or water-dispersible coating compositions, adhesives or sealants, and for improving manual stirring behavior of the coating compositions, the adhesives or the sealants; a coating composition, an adhesive or a sealant comprising the modified polyisocyanate; especially the use of the modified polyisocyanate in the wood coating; a method for preparing an aqueous two-component coating composition; a product obtained by applying the coating composition on a substrate; and a method for manufacturing the product.

The number average molecular weight of the modified polyisocyanate of the present invention is measured by gel permeation chromatography according to DIN 55672-1:2016-03 with polystyrene as the standard and tetrahydrofuran as the eluent.

The sulfonate group in the present invention refers to a $SO_3^{2-}$ group with a molar mass of 80 g/mol.

The viscosity of the modified polyisocyanate of the present invention is measured according to DIN EN ISO 3219:1994-10 at 23° C. and at a shear rate of 10 $s^{-1}$.

The term "polyurethane" used herein refers to polyurethane urea and/or polyurethane polyurea and/or polyurea and/or polythiourethane.

The term "molecular weight distribution" used herein refers to the ratio of the weight average molecular weight to the number average molecular weight of the modified polyisocyanate.

Modified Polyisocyanate

The modified polyisocyanate of the present invention may also refer to a mixture of modified polyisocyanates.

The modified polyisocyanate is water-dispersible or water-soluble.

The molecular weight distribution of the modified polyisocyanate is preferably in a range of 1.2-2.0.

The iminooxadiazinedione structure of the modified polyisocyanate is of formula II:

II

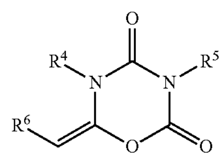

wherein $R^4$, $R^5$ and $R^6$ are each independently identical or different, and may be a group obtained by removing an isocyanate group from an aliphatic, alicyclic, aromatic and/or araliphatic diisocyanate, or a group obtained by removing an isocyanate group from an aliphatic, alicyclic, aromatic and/or araliphatic oligomeric polyisocyanate, or a group obtained by reacting a group obtained by removing an isocyanate group from a reaction product of an aliphatic, alicyclic, aromatic and/or araliphatic diisocyanate with an aminosulfonic acid, or a group obtained by reacting a group obtained by removing an isocyanate group from a reaction product of an aliphatic, alicyclic, aromatic and/or araliphatic oligomeric polyisocyanate with an aminosulfonicacid.

The isocyanurate structure of the modified polyisocyanate is of formula III:

III

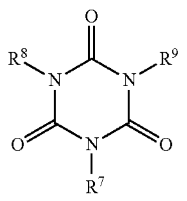

wherein $R^7$, $R^8$ and $R^9$ are each independently identical or different, and may be a group obtained by removing an isocyanate group from an aliphatic, alicyclic, aromatic and/or araliphatic diisocyanate, or a group obtained by removing an isocyanate group from an aliphatic, alicyclic, aromatic and/or araliphatic oligomeric polyisocyanate, or a group obtained by reacting a group obtained by removing an isocyanate group from a reaction product of an aliphatic, alicyclic, aromatic and/or araliphatic diisocyanate with an aminosulfonic acid, or a group obtained by reacting a group obtained by removing an isocyanate group from a reaction product of an aliphatic, alicyclic, aromatic and/or araliphatic oligomeric polyisocyanate with an aminosulfonicacid.

$R^1$, $R^5$, $R^6$, $R^7$, $R^8$ and $R^9$ may be each independently identical or different.

The weight ratio of the iminooxadiazinedione structure to the isocyanurate structure in the modified polyisocyanate is preferably of 1:5-1:1, and most preferably 1:5-1:2.

The number average molecular weight of the modified polyisocyanate is preferably of 700 g/mol-1500 g/mol, more preferably 750 g/mol-1200 g/mol, more preferably 750 g/mol-1000 g/mol, and most preferably 750 g/mol-900 g/mol. The number average molecular weight is measured by gel permeation chromatography according to DIN 55672-1: 2016-03 with polystyrene as the standard and tetrahydrofuran as the eluent.

The weight average molecular weight of the modified polyisocyanate is measured by gel permeation chromatography according to DIN 55672-1: 2016-03 with polystyrene as the standard and tetrahydrofuran as the eluent.

The total amount of molecules with a number average molecular weight greater than 2700 g/mol in the modified polyisocyanate is preferably 4.1% by weight to 20% by weight, more preferably 4.1% by weight to 16% by weight, and most preferably 4.1% by weight to 11% by weight, relative to the total weight of the modified polyisocyanate.

The molecular weight distribution of the modified polyisocyanate is preferably in a range of 1.3-1.7, and most preferably of 1.3-1.6.

The weight sum of the iminooxadiazinedione structure and the isocyanurate structure in the modified polyisocyanate is preferably not less than 5% by weight, relative to the total weight of the modified polyisocyanate.

The amount of sulfonate groups in the modified polyisocyanate is preferably of 0.1% by weight to 7.0% by weight, and most preferably 0.9% by weight to 1.5% by weight, relative to the total weight of the modified polyisocyanate.

The viscosity of the modified polyisocyanate is preferably greater than 2250 mPa·s and not more than 30000 mPa·s, most preferably 2300 mPa·s-15000 mPa·s, which is measured with the modified polyisocyanate at 23° C. and at a shear rate of 10 $s^{-1}$ according to DIN EN ISO 3219:1994-10 in the absence of solvent.

The isocyanate group content in the modified polyisocyanate is preferably of 7% by weight to 23% by weight, more preferably 19% by weight to 22% by weight, and most preferably 19.5% by weight to 22% by weight, relative to the total weight of the modified polyisocyanate.

The platinum-cobalt color value of the modified polyisocyanate is preferably of 16 to 31.

Component a) Aminosulfonic Acid

The component a) aminosulfonic acid is preferably of formula I:

I

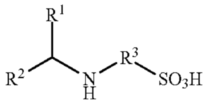

wherein, $R^1$ and $R^2$ are each independently hydrogen, a substituted or unsubstituted and/or heteroatom-containing aliphatic group with 1-18 carbon atoms, a substituted or unsubstituted and/or heteroatom-containing alicyclic group with 3-18 carbon atoms, a substituted or unsubstituted and/or heteroatom-containing aromatic groups with 1-18 carbon atoms; or $R^1$ reacts with $R^2$ to form an alicyclic group with 3-8 carbon atoms, or a heterocyclic group substituted by an oxygen atom or a nitrogen atom with 3-8 carbon atoms; $R^3$ is a linear or branched aliphatic group with 2-8 carbon atoms.

$R^1$ reacts with $R^2$ to form an alicyclic group with 3-8 carbon atoms or a heterocyclic group substituted by an oxygen atom or a nitrogen atom with 3-8 carbon atoms, and the heterocyclic group is preferably further substituted.

$R^3$ is preferably a linear or branched aliphatic group with 2-4 carbon atoms, more preferably a linear or branched aliphatic group with 2-3 carbon atoms, and most preferably a linear or branched aliphatic group with 3 carbon atoms.

The aminosulfonic acid may be one aminosulfonic acid or any mixture of more aminosulfonic acids of formula I.

The aminosulfonic acid is preferably one or more of 3-cyclohexylaminopropane-1-sulfonic acid, 4-cyclohexylamino-1-butanesulfonic acid and 2-cyclohexylaminoethane-1-sulfonic acid, more preferably one or more of 3-cyclohexylaminopropane-1-sulfonic acid and 4-cyclohexylamino-1-butanesulfonic acid, and most preferably 3-cyclohexylaminopropane-1-sulfonic acid.

The amount of the aminosulfonic acid is preferably 0.28% by weight to 22% by weight, more preferably 1.5% by weight to 3.5% by weight, still preferably 2% by weight to 3% by weight, and most preferably 2.2% by weight to 2.9% by weight, relative to the total weight of component a) and component b).

The amount of sulfonate groups in the aminosulfonic acid is preferably of 0.1% by weight to 7% by weight, relative to the total weight of the modified isocyanate.

Component b) Polyisocyanate

The polyisocyanate of the present invention refers to a raw material for preparing the modified polyisocyanate.

The polyisocyanate preferably comprises at least an iminooxadiazinedione structure and at least an isocyanurate structure.

The iminooxadiazinedione structure preferably is of formula IV:

IV

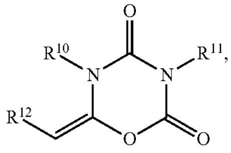

wherein $R^{10}$, $R^{11}$ and $R^{12}$ are each independently identical or different, and may be a group obtained by removing an isocyanate group from an aliphatic, alicyclic, aromatic and/or araliphatic diisocyanate, or a group obtained by removing an isocyanate group from an aliphatic, alicyclic, aromatic and/or araliphatic oligomeric polyisocyanate.

The isocyanurate structure is of formula V:

V

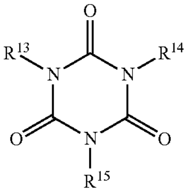

wherein $R^{13}$, $R^{14}$ and $R^{15}$ are each independently identical or different, and may be a group obtained by removing an isocyanate group from an aliphatic, alicyclic, aromatic and/or araliphatic diisocyanate, or a group obtained by removing an isocyanate group from an aliphatic, alicyclic, aromatic and/or araliphatic oligomeric polyisocyanate.

$R^{10}$, $R^{11}$, $R^{12}$, $R^{13}$, $R^{14}$ and $R^{15}$ may be each independently identical or different.

The weight ratio of the iminooxadiazinedione structure to the isocyanurate structure in the polyisocyanate is preferably greater than 1:5, more preferably greater than 1:5 and not more than 1:1, more preferably 1:4-1:1, and most preferably 1:4-1:2.

The number average molecular weight of the polyisocyanate is preferably of 600 g/mol-1400 g/mol, more preferably 700 g/mol-1200 g/mol, more preferably 750 g/mol-1200 g/mol, and most preferably 950 g/mol-1200 g/mol. The number average molecular weight is measured by gel permeation chromatography according to DIN 55672-1: 2016-03 with polystyrene as the standard and tetrahydrofuran as the eluent.

The total amount of molecules with a number average molecular weight greater than 2700 g/mol in the polyisocyanate is preferably 2.5% by weight to 17% by weight, more preferably 4.1% by weight to 15% by weight, still preferably 4.1% by weight to 12% by weight, and most preferably 5% by weight to 10% by weight, relative to the total weight of the polyisocyanate.

The weight sum of the iminooxadiazinedione structure and the isocyanurate structure in the polyisocyanate is preferably not less than 5% by weight, relative to the total weight of the polyisocyanate.

The content of the monomeric diisocyanate in the polyisocyanate is preferably less than 0.1%, and most preferably less than 0.5% by weight, relative to the total weight of the polyisocyanate.

The viscosity of the polyisocyanate is preferably 500 mPa·s-15000 mPa·s, more preferably 700 mPa·s-10000 mPa·s, and most preferably 700 mPa·s-6000 mPa·s, which is measured at 23° C. and at a shear rate of 10 $s^{-1}$ according to DIN EN ISO 3219:1994-10.

The amount of the polyisocyanate is preferably not less than 5% by weight, relative to the total weight of the components in the reaction.

The polyisocyanate is preferably one or more of aliphatic polyisocyanates, alicyclic polyisocyanates, araliphatic polyisocyanates and aromatic polyisocyanates.

In addition to the isocyanurate structure and the iminooxadiazinedione structure, the polyisocyanate may further comprise one or more of the following structures: biuret, uretdione, and allophanate.

The polyisocyanate is preferably composed of at least two diisocyanates and in particular prepared by simple modification of aliphatic, alicyclic, araliphatic and/or aromatic diisocyanates, for example as described in the following documents: J. Prakt. Chem. 336 (1994) 185-200, DE-A1670666, DE-A1954093, DE-A2414413, DE-A2452532, DE-A2641380, DE-A3700209, DE-A3900053 and DE-A3928503 or EP-A0336205, EP-A0339396 and EP-A0798299. The diisocyanates can be prepared in various ways, for example by phosgenation in the liquid or gas phase or by a phosgene-free route, for example by thermal urethane cleavage.

The weight average molecular weight of the diisocyanate is preferably of 140-400.

The diisocyanate is preferably one or more of 1,4-diisocyanatobutane, 1,5-diisocyanatopentane (PDI), 1,6-diisocyanatohexane (HDI), 2-methyl-1,5-diisocyanatopentane, 1,5-diisocyanato-2,2-dimethylpentane, 2,2,4-trimethyl-1,6-diisocyanatohexane, 2,4,4-trimethyl-1,6-diisocyanatohexane, 1,10-diisocyanatodecane, 1,3-diisocyanatocyclohexane, 1,4-diisocyanatocyclohexane, 1,3-bis(isocyanatomethyl)-cyclohexane, 1,4-bis(isocyanatomethyl)-cyclohexane, 1-isocyanato-3,3,5-trimethyl-5-isocyanatomethylcyclohexane (isophorone diisocyanate, IPDI), 4,4'-diisocyanatodicyclohexylmethane, 1-isocyanato-1-methyl-4(3) isocyanato-methylcyclohexane, bis(isocyanatomethyl)-norbornane, 1,3- and 1,4-bis(2-isocyanato-prop-2-yl)-benzene (TMXDI), 2,4-diisocyanatotoluene, 2,6-diisocyanatotoluene, 2,4'-diisocyanatodiphenylmethane, 4,4'-diisocyanatodiphenylmethane and 1,5-diisocyanatonaphthalene.

The polyisocyanate is preferably one or more of aliphatic polyisocyanates and alicyclic polyisocyanates, more preferably aliphatic polyisocyanates, and more preferably one or more of derivatives with an isocyanurate structure and an iminooxadiazinedione structure of hexamethylene diisocyanate, pentamethylene diisocyanate, isophorone diisocyanate and 4,4'-diisocyanatodicyclohexylmethane, and more preferably one or more of derivatives with an isocyanurate structure and an iminooxadiazinedione structure of hexamethylene diisocyanate, pentamethylene diisocyanate, isophorone diisocyanate and 4,4'-diisocyanatodicyclohexylmethane, and most preferably one or more of hexamethylene diisocyanate derivatives with an isocyanurate structure and an iminooxadiazinedione structure and pentamethylene diisocyanate derivatives with an isocyanurate structure and an iminooxadiazinedione structure.

The polyisocyanate is preferably hydrophobic.

When the system comprises two or more polyisocyanates, the number average molecular weight of the polyisocyanate, the total amount of molecules with a number average molecular weight greater than 2700 g/mol, the weight ratio of the iminooxadiazinedione structure to the isocyanurate structure in the polyisocyanate, and the viscosity all refer to the average value.

When the system comprises two or more polyisocyanates, the weight ratio of the iminooxadiazinedione structure to the isocyanurate structure in each polyisocyanate is most preferably greater than 1:5, preferably greater than 1:5 and not more than 1:1, more preferably 1:4-1:1, and most preferably 1:4-1:2.

Component c) Tertiary Amine

The tertiary amine of the present invention is used to neutralize the sulfonic acid group of the aminosulfonic acid.

The tertiary amine is preferably one or more of tertiary monoamine, tertiary diamine, and other tertiary amines containing groups reactive toward isocyanate.

The tertiary monoamine is preferably one or more of trimethylamine, triethylamine, tripropylamine, tributylamine, dimethylcyclohexylamine, N-methylmorpholine, N-ethylmorpholine, N-methylpiperidine and N-ethylpiperidine and N,N-dimethylcyclohexylamine.

The tertiary diamine is preferably one or more of 1,3-bis-(dimethylamino)-propane, 1,4-bis-(dimethylamino)-butane and N,N'-dimethylpiperazine.

The tertiary amine is most preferably N,N-dimethylcyclohexylamine.

Other tertiary amines containing groups reactive toward isocyanate are preferably neutralizing amines, which are preferably alkanolamines, such as dimethylethanolamine, methyldiethanolamine and/or triethanolamine.

The molar equivalent ratio of the tertiary amine to the sulfonate group of the aminosulfonic acid is preferably of 0.3-1.9, and most preferably 0.6-1.4.

The amount of the tertiary amine is sufficient to catalyze the reaction of components a, b and optionally component d, while other conventional catalysts known in polyurethane chemistry are optionally used to accelerate the reaction in the method of the present invention. The conventional catalyst is preferably one or more of other tertiary amines and metal salts.

Other tertiary amines are preferably one or more of triethylamine, pyridine, picoline, benzyldimethylamine, N,N-ethylenepiperazine, N-methylpiperidine, pentamethyldiethylenetriamine, N,N-dimethyl-aminocyclohexane and N,N'-dimethylpiperazine.

The metal salt is preferably one or more of ferric chloride, aluminum tris(ethyl-acetoacetate), zinc chloride, zinc n-octanoate, zinc 2-ethyl-1-hexanoate, zinc 2-ethylhexanoate, zinc stearate, zinc naphthenate, zinc acetylacetonate, tin n-octoate, tin 2-ethyl-1-hexanoate, tin ethylhexanoate, tin laurate, tin palmitate, dibutyl tin oxide, dibutyl tin dichloride, dibutyl tin diacetate, dibutyltin bis(butyl maleate), dibutyl tin dilaurate, dioctyl tin diacetate and molybdenum glycolate.

The amount of the conventional catalyst is preferably of 0.001% by weight to 2.0% by weight, and most preferably 0.005% by weight to 0.5% by weight, relative to the total weight of the components in the reaction.

Component d) Polyether Alcohol Containing Ethylene Oxide Groups

The ethylene oxide group content in the polyether alcohol containing ethylene oxide groups is of 0% by weight to 17% by weight, preferably 0% by weight to 13% by weight, and most preferably 0% by weight to 5% by weight, relative to the total weight of the components in the reaction.

The polyether alcohol containing ethylene oxide groups preferably contains a statistical average of 5-30, and most preferably 7-25 ethylene oxide groups per molecule.

The polyether alcohols containing ethylene oxide groups may be obtained in a known manner by alkoxylation of suitable starting material molecules, for example as described in Ullmanns Encyclopdie der technischen Chemie, 4th edition, volume 19, Verlag Chemie Weinheim, pp. 31-38.

The suitable starting material molecules are preferably one or more of saturated monohydric alcohols, unsaturated alcohols, aromatic alcohols, araliphatic alcohols, secondary monoamines and heterocyclic secondary amines.

The saturated monohydric alcohol is preferably one or more of methanol, ethanol, n-propanol, isopropanol, n-butanol, isobutanol, sec-butanol, isomeric pentanol, hexanol, octanol, nonanol, n-decyl alcohol, n-dodecanol, n-tetradecanol, n-hexadecanol, n-octadecyl alcohol, cyclohexanol, isomeric methylcyclohexanol, hydroxymethylcyclohexane, 3-ethyl-3-oxabutane methanol and tetrahydrofurfuryl alcohol.

The unsaturated alcohol is preferably one or more of allyl alcohol, 1,1-dimethylallyl alcohol and oleyl alcohol.

The aromatic alcohol is preferably one or more of phenols, isomeric cresols and methoxyphenol. The araliphatic alcohol is preferably one or more of benzyl alcohol, anisyl alcohol and cinnamyl alcohol.

The secondary monoamine is preferably one or more of dimethylamine, diethylamine, dipropylamine, diisopropylamine, di-n-butylamine, diisobutylamine, bis(2-ethylhexyl)-amine, N-methylcyclohexylamine, N-ethylcyclohexylamine and dicyclohexylamine.

The heterocyclic secondary amine is preferably one or more of morpholine, pyrrolidine, piperidine and 1H-pyrazole.

The suitable starting material molecule is further preferably a saturated monohydric alcohol having 1-4 carbon atoms, most preferably methanol.

The alkylene oxides suitable for the alkoxylation, in particular ethylene oxide and/or propylene oxide, can be used in the alkoxylation in any order or as a mixture.

The polyether alcohol containing ethylene oxide groups can be one polyether alcohol containing ethylene oxide groups or any mixture of more polyether alcohols containing ethylene oxide groups.

The amount of the ethylene oxide groups contained in the alkylene oxide unit in the polyether alcohol containing ethylene oxide groups is preferably not less than 30 mol %, and most preferably not less than 40 mol %.

The polyether alcohol containing ethylene oxide groups is most preferably polyethylene glycol-methyl ether alcohol, which contains a statistical average of 7-30, most preferably 7-25 ethylene oxide groups per molecule.

The polyether alcohol containing ethylene oxide groups according to the present invention may be added separately, or the polyisocyanate may already contain polyether units of ethylene oxide. When the polyisocyanate already contains polyether units of ethylene oxide, the polyisocyanate is hydrophilically modified with polyether alcohol containing ethylene oxide groups, for example, those prepared by the method described in EP A0959087, page 2, lines 25-46.

Solvent

The components in the reaction for preparing the modified polyisocyanate may further comprise a solvent.

The solvent is a known conventional solvent that can be used to prepare modified polyisocyanates, preferably one or more of ethyl acetate, butyl acetate, propylene glycol methyl ether acetate, 3-methoxy n-butyl acetate, 1-methoxyprop-2-yl acetate, 3-methoxy-n-butyl acetate, acetone, 2-butanone, 4-methyl-2-pentanone, cyclohexanone, toluene, xylene, chlorobenzene, petroleum solvents, more highly substituted aromatic compounds, carbonates, lactones, propylene glycol diacetate, diethylene glycol dimethyl ether, dipropylene glycol dimethyl ether, diethylene glycol ethyl ether acetate, diethylene glycol butyl ether acetate, N-methylpyrrolidone and N-methylcaprolactam.

The more highly substituted aromatic compounds are preferably solvent naphtha under the trade names of Solvesso, Isopar, Nappar and Shellsol.

The carbonate is preferably one or more of dimethyl carbonate, diethyl carbonate, 1,2-ethylene carbonate, and 1,2-propylene carbonate.

The lactone is preferably one or more of β-propiolactone, γ-butyrolactone, ε-caprolactone and ε-methylcaprolactone.

The modified polyisocyanate is preferably obtained by the reaction of the following components:

a. 3-cyclohexylaminopropane-1-sulfonic acid and/or 4-cyclohexylamino-1-butanesulfonic acid;
b. a hexamethylene diisocyanate derivative with an isocyanurate structure and an iminooxadiazinedione structure and/or a pentamethylene diisocyanate derivative with an isocyanurate structure and an iminooxadiazinedione structure; and
c. a tertiary amine;

wherein the weight ratio of the iminooxadiazinedione structure to the isocyanurate structure in the modified polyisocyanate is of 1:5-1:1, and the number average molecular weight of the modified polyisocyanate is of 700 g/mol-1500 g/mol, and the molecular weight distribution is in a range of 1.2-2.0; and the total amount of molecules with a number average molecular weight greater than 2700 g/mol in the modified polyisocyanate is 4.1% by weight to 22% by weight, relative to the total weight of the modified polyisocyanate.

The modified polyisocyanate is more preferably obtained by the reaction of the following components:

a. 3-cyclohexylaminopropane-1-sulfonic acid and/or 4-cyclohexylamino-1-butanesulfonic acid;
b. a hexamethylene diisocyanate derivative with an isocyanurate structure and an iminooxadiazinedione structure and/or a pentamethylene diisocyanate derivative with an isocyanurate structure and an iminooxadiazinedione structure; and
c. a tertiary amine;

wherein the weight ratio of the iminooxadiazinedione structure to the isocyanurate structure in the modified polyisocyanate is of 1:5-1:1, and the number average molecular weight of the modified polyisocyanate is of 700 g/mol-1200 g/mol, and the molecular weight distribution is in a range of 1.2-2.0; and the total amount of molecules with a number average molecular weight greater than 2700 g/mol in the modified polyisocyanate is 4.1% by weight to 16% by weight, relative to the total weight of the modified polyisocyanate.

The modified polyisocyanate is preferably obtained by the reaction of the following components:

a. 3-cyclohexylaminopropane-1-sulfonic acid and/or 4-cyclohexylamino-1-butanesulfonic acid;
b. a hexamethylene diisocyanate derivative with an isocyanurate structure and an iminooxadiazinedione structure and/or a pentamethylene diisocyanate derivative with an isocyanurate structure and an iminooxadiazinedione structure; and
c. a tertiary amine;

wherein the weight ratio of the iminooxadiazinedione structure to the isocyanurate structure in the modified polyisocyanate is of 1:5-1:1, and the number average molecular weight of the modified polyisocyanate is of 700 g/mol-1200 g/mol, and the molecular weight distribution is in a range of 1.2-2.0; and the total amount of molecules with a number average molecular weight greater than 2700 g/mol in the modified polyisocyanate is 4.1% by weight to 15% by weight, relative to the total weight of the modified polyisocyanate; and the amount of sulfonate groups in the modified polyisocyanate is of 0.9% by weight to 1.5% by weight, and the amount of isocyanate groups is of 19% by weight to 22% by weight, relative to the total weight of the modified polyisocyanate; and the viscosity of the modified polyisocyanate is of 2300 mPa·s-15000 mPa·s.

The modified polyisocyanate is most preferably obtained by the reaction of the following components:

a. 3-cyclohexylaminopropane-1-sulfonic acid and/or 4-cyclohexylamino-1-butanesulfonic acid in an amount of 0.28% by weight to 22% by weight, relative to the total weight of component a and component b;
b. a hexamethylene diisocyanate derivative with an isocyanurate structure and an iminooxadiazinedione structure and/or a pentamethylene diisocyanate derivative with an isocyanurate structure and an iminooxadiazinedione structure, wherein the weight ratio of the iminooxadiazinedione structure to the isocyanurate structure in component b) is 1:5-1:1, and most preferably 1:4-1:2; and
c. N,N-dimethylcyclohexylamine with a molar equivalent ratio relative to the sulfonate group of component a) of 0.3-1.9;

wherein the weight ratio of the iminooxadiazinedione structure to the isocyanurate structure in the modified polyisocyanate is of 1:5-1:2, and the number average molecular weight of the modified polyisocyanate is of 750 g/mol-900 g/mol, and the molecular weight distribution is in a range of 1.3-1.6; and the total amount of molecules with a number average molecular weight greater than 2700 g/mol in the modified polyisocyanate is 4.1% by weight to 15% by weight, relative to the total weight of the modified polyisocyanate.

The modified polyisocyanate is most preferably obtained by the reaction of the following components:

a. 3-cyclohexylaminopropane-1-sulfonic acid and/or 4-cyclohexylamino-1-butanesulfonic acid in an amount of 0.28% by weight to 22% by weight, relative to the total weight of component a and component b;
b. a hexamethylene diisocyanate derivative with an isocyanurate structure and an iminooxadiazinedione structure and/or a pentamethylene diisocyanate derivative with an isocyanurate structure and an iminooxadiazinedione structure, wherein the weight ratio of the iminooxadiazinedione structure to the isocyanurate structure in component b) is 1:5-1:1, and most preferably 1:4-1:2; and c. N,N-dimethylcyclohexylamine with a molar equivalent ratio relative to the sulfonate group of component a) of 0.3-1.9;

wherein the weight ratio of the iminooxadiazinedione structure to the isocyanurate structure in the modified polyisocyanate is of 1:5-1:2, and the number average molecular weight of the modified polyisocyanate is of 750 g/mol-900 g/mol, and the molecular weight distribution is in a range of 1.3-1.6; and the total amount of molecules with a number average molecular weight greater than 2700 g/mol in the modified polyisocyanate is 4.1% by weight to 15% by weight, relative to the total weight of the modified polyisocyanate; and the amount of sulfonate groups in the modified polyisocyanate is of 0.9% by weight to 1.5% by weight, and the amount of isocyanate groups is of 19.5% by weight to 22% by weight, relative to the total weight of the modified polyisocyanate; and the viscosity of the modified polyisocyanate is of 2300 mPa·s-15000 mPa·s.

Method for Preparing a Modified Polyisocyanate

The method for preparing a modified polyisocyanate comprises the steps of: reacting at a temperature of 40° C.-150° C. in the presence of component a), component b), component c) and optionally component d), wherein the molar equivalent ratio of the NCO groups to the groups reactive toward NCO groups of 2:1 to 400:1 is maintained.

The reaction temperature is preferably of 50° C. to 130° C.

The molar equivalent ratio of the NCO groups to the groups reactive toward NCO groups is preferably of 4:1-250:1, most preferably until the reaction reaches the theoretically calculated NCO content.

The modified polyisocyanate is clear, colorless or nearly colorless.

Use

The modified polyisocyanate is preferably used in a form of an aqueous emulsion.

The polyisocyanate of the present invention is preferably used as a crosslinking component, a component for water-soluble or a water-dispersible coating compositions, adhesives or sealants, which has groups reactive toward isocyanate groups, especially alcoholic hydroxyl groups, and is used in the production of coatings based on such aqueous coating compositions, adhesives or sealants.

When the modified polyisocyanate of the present invention is used as a crosslinking component in water-soluble or water-dispersible coating compositions, the molar ratio of NCO groups of the modified polyisocyanate to the groups reactive toward NCO groups, particularly alcoholic hydroxyl groups, is preferably 0.5:1 to 2:1.

When the modified polyisocyanate of the present invention is used as a crosslinking component in water-soluble or water-dispersible adhesives or sealants, they may optionally be incorporated in a small amount into nonfunctional water-soluble or water-dispersible adhesives or sealants to obtain very specific properties, for example as an additive for improving adhesion, for example as a papermaking aid or additive without absorbable halides, or for inorganic building materials such as concrete or mortar.

The coating composition, the adhesive or the sealant containing the modified polyisocyanate may further comprise a polyisocyanate other than the modified polyisocyanate. The polyisocyanate other than the modified polyisocyanate is preferably added to the modified polyisocyanate before being mixed with the resin component.

The polyisocyanate other than the modified polyisocyanate is preferably used in an amount that does not affect the performance of the coating compositions, the adhesives, or the sealants containing the aqueous hydroxy resin dispersion and the modified polyisocyanate. For this combination, the modified polyisocyanate of the present invention functions as an emulsifier for the polyisocyanate other than the modified polyisocyanate.

Use in the Preparation of Polyurethane

The modified polyisocyanate can also be used in an aqueous one-component polyurethane system in the form of being blocked by a blocking agent. Suitable blocking agent is, for example, diethyl malonate, ethyl acetoacetate, acetoxime, butanone oxime, ε-caprolactam, 3,5-dimethylpyrazole, 1,2,4-triazole, dimethyl-1,2,4-triazole, imidazole or any mixture of these blocking agents.

The modified polyisocyanate has excellent emulsifiability in water and can be uniformly distributed. The coating formed by a polyurethane containing said modified polyisocyanate has excellent optical properties, especially high surface gloss and high transparency.

Method for Manufacturing a Product

Coating can be carried out by means of mechanical tools known to those skilled in the art or a two-component spray gun.

The substrate can be any substrate, preferably made of metal, wood, alloy, inorganic material, glass, stone, ceramic raw material, concrete, rigid synthetic material, soft synthetic material, textile, leather or paper, and most preferably wood, metal, alloy or inorganic material.

The substrate may optionally have a conventional primer before being coated.

Aqueous Two-component Coating Composition

The aqueous hydroxyl resin dispersion is preferably a hydroxyl group-containing polyacrylate dispersion, and most preferably a hydroxyl group-containing polyacrylate dispersion with a weight average molecular weight of 1000-10000.

In principle, all compounds which are dissolved or dispersed in water and contain groups reactive toward isocyanate are suitable as reaction partners for the aqueous two-component coating composition of the present invention, such as, polyurethane or polyurea dispersed in water, wherein active hydrogen atoms are present in the urethane or urea groups, and the polyurethane or polyurea can be crosslinked with the modified polyisocyanate.

The aqueous two-component coating composition may optionally contain conventional auxiliaries and additives in the coating field, for example, one or more of flow aids, coloring pigments, fillers, defoamers, cosolvents, matting agents and emulsifiers.

The coating formed by drying the aqueous two-component coating composition at room temperature has good performance.

The aqueous two-component coating composition can also be dried at an elevated temperature or at a temperature of up to 260° C.

The aqueous two-component coating composition may be wood coating, textile coating, plastic coating, architectural coating, or metal coating, and most preferably wood coating.

The present invention in particular pertains to the following aspects:

1. A modified polyisocyanate comprising an iminooxadiazinedione structure and an isocyanurate structure, wherein the weight ratio of the iminooxadiazinedione structure to the isocyanurate structure is not less than 1:5; and the total amount of molecules with a number average molecular weight greater than 2700 g/mol in the modified polyisocyanate is 4.1% by weight to 22% by weight, relative to the total weight of the modified polyisocyanate; and the modified polyisocyanate is obtainable by the reaction of:

a. at least an aminosulfonic acid;

b. at least a polyisocyanate;

c. at least a tertiary amine; and d. optionally, a polyether alcohol containing ethylene oxide groups.

2. The modified polyisocyanate according to aspect 1, wherein the molecular weight distribution of the modified polyisocyanate is in a range of 1.2-2.0.

3. The modified polyisocyanate according to aspect 1 or 2, wherein the weight ratio of the iminooxadiazinedione structure to the isocyanurate structure in the modified polyisocyanate is of 1:5-1:1, and most preferably 1:5-1:2.

4. The modified polyisocyanate according to any one of aspects 1-3, wherein the total amount of molecules with a number average molecular weight greater than 2700 g/mol in the modified polyisocyanate is 4.1% by weight to 20% by weight, more preferably 4.1% by weight to 16% by weight, most preferably 4.1% by weight to 11% by weight, relative to the total weight of the modified polyisocyanate.

5. The modified polyisocyanate according to any one of aspects 1-4, wherein the molecular weight distribution of the modified polyisocyanate is in a range of 1.3-1.7, and most preferably 1.3-1.6.

6. The modified polyisocyanate according to any one of aspects 1-5, wherein the amount of sulfonate groups in the modified polyisocyanate is of 0.1% by weight to 7% by weight, relative to the total weight of the modified polyisocyanate.

7. The modified polyisocyanate according to any one of aspects 1-6, wherein the viscosity of the modified polyisocyanate is greater than 2250 mPa·s and not more than 30000 mPa·s, and most preferably 2300 mPa·s-15000 mPa·s, which is measured with the modified polyisocyanate in the absence of solvent.

8. The modified polyisocyanate according to any one of aspects 1-7, wherein the number average molecular weight of the modified polyisocyanate is of 700 g/mol-1500 g/mol, more preferably 750 g/mol-1200 g/mol, still more preferably 750 g/mol-1000 g/mol, and most preferably 750 g/mol-900 g/mol, which is measured according to gel permeation chromatography and DIN 55672-1: 2016-03 with polystyrene as standard and tetrahydrofuran as eluent.

9. The modified polyisocyanate according to any one of aspects 1-8, wherein the isocyanate group content in the modified polyisocyanate is of 7% by weight to 23% by weight, more preferably 19% by weight to 22% by weight, and most preferably 19.5% by weight to 22% by weight, relative to the total weight of the modified polyisocyanate.

10. The modified polyisocyanate according to any one of aspects 1-9, wherein the component a) aminosulfonic acid is of formula I:

I

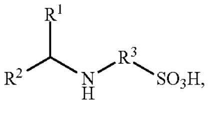

wherein, $R^1$ and $R^2$ are each independently hydrogen, a substituted or unsubstituted and/or heteroatom-containing aliphatic group with 1-18 carbon atoms, a substituted or unsubstituted and/or heteroatom-containing alicyclic group with 3-18 carbon atoms, a substituted or unsubstituted and/or heteroatom-containing aromatic group with 1-18 carbon atoms; or $R^1$ reacts with $R^2$ to form an alicyclic group with 3-8 carbon atoms or a heterocyclic group substituted by an oxygen atom or a nitrogen atom with 3-8 carbon atoms; $R^3$ is a linear or branched aliphatic group with 2-8 carbon atoms.

11. The modified polyisocyanate according to any one of aspects 1-10, wherein $R^3$ in component a) aminosulfonic acid is a linear or branched aliphatic group with 2-4 carbon atoms, more preferably a linear or branched aliphatic group with 2-3 carbon atoms, and most preferably a linear or branched aliphatic group with 3 carbon atoms.

12. The modified polyisocyanate according to any one of aspects 1-11, wherein the component a) aminosulfonic acid is one or more of 3-cyclohexylaminopropane-1-sulfonic acid, 4-cyclohexylamino-1-butanesulfonic acid and 2-cyclohexylaminoethane-1-sulfonic acid, more preferably one or more of 3-cyclohexylamino-propane-1-sulfonic acid and 4-cyclohexylamino-1-butanesulfonic acid, and most preferably 3-cyclohexylaminopropane-1-sulfonic acid.

13. The modified polyisocyanate according to any one of aspects 1-12, wherein the amount of component a) aminosulfonic acid is of 1.5% by weight to 3.5% by weight, preferably 2% by weight to 3% by weight, most preferably 2.2% by weight to 2.9% by weight, relative to the total weight of component a) and component b).

14. The modified polyisocyanate according to any one of aspects 1-13, wherein the amount of sulfonate groups in component a) aminosulfonic acid is of 0.1% by weight to 7% by weight, relative to the total weight of the modified polyisocyanate.

15. The modified polyisocyanate according to any one of aspects 1-14, wherein component b) polyisocyanate comprises an iminooxadiazinedione structure and an isocyanurate structure, and the weight ratio of the iminooxadiazinedione structure to the isocyanurate structure is greater than 1:5, preferably greater than 1:5 and not more than 1:1, more preferably 1:4-1:1, most preferably 1:4-1:2.

16. The modified polyisocyanate according to any one of aspects 1-15, wherein component b) polyisocyanate is one or more of aliphatic polyisocyanates and alicyclic polyisocyanates, most preferably one or more of hexamethylene diisocyanate derivatives with an isocyanurate structure and an iminooxadiazinedione structure and pentamethylene diisocyanate derivatives with an isocyanurate structure and an iminooxadiazinedione structure.

17. The modified polyisocyanate according to any one of aspects 1-16, wherein the ethylene oxide group content in the polyether alcohol containing ethylene oxide groups is of 0% by weight to 17% by weight, preferably 0% by weight to 13% by weight, most preferably 0% by weight to 5% by weight, relative to the total weight of the components in the reaction.

18. The modified polyisocyanate according to any one of aspects 1-17, wherein the modified polyisocyanate is obtained by the reaction of the following components:

a. 3-cyclohexylaminopropane-1-sulfonic acid and/or 4-cyclohexylamino-1-butanesulfonic acid;

b. a hexamethylene diisocyanate derivative with an isocyanurate structure and an iminooxadiazinedione structure and/or a pentamethylene diisocyanate derivative with an isocyanurate structure and an iminooxadiazinedione structure; and c. a tertiary amine;

wherein the weight ratio of the iminooxadiazinedione structure to the isocyanurate structure in the modified polyisocyanate is of 1:5-1:1, and the number average molecular weight of the modified polyisocyanate is of 700 g/mol-1500 g/mol, and the molecular weight distribution is in a range of 1.2-2.0; and the total amount of molecules with a number average molecular weight greater than 2700 g/mol in the modified polyisocyanate is 4.1% by weight to 22% by weight, relative to the total weight of the modified polyisocyanate.

19. The modified polyisocyanate according to any one of aspects 1-18, wherein the modified polyisocyanate is obtained by the reaction of the following components:

a. 3-cyclohexylaminopropane-1-sulfonic acid and/or 4-cyclohexylamino-1-butanesulfonic acid in an amount of 0.28% by weight to 22% by weight, relative to the total weight of component a) and component b);

b. a hexamethylene diisocyanate derivative with an isocyanurate structure and an iminooxadiazinedione structure and/or a pentamethylene diisocyanate derivative with an isocyanurate structure and an iminooxadiazinedione structure, wherein the weight ratio of the iminooxadiazinedione structure to the isocyanurate structure in component b) is greater than 1:5 and not more than 1:1, more preferably 1:4-1:1, and most preferably 1:4-1:2;

c. N,N-dimethylcyclohexylamine with a molar equivalent ratio relative to the sulfonate group of component a) of 0.3-1.9;

wherein the weight ratio of the iminooxadiazinedione structure to the isocyanurate structure in the modified polyisocyanate is of 1:5-1:2, and the number average molecular weight of the modified polyisocyanate is of 750 g/mol-900 g/mol, and the molecular weight distribution is in a range of 1.3-1.6; and the total amount of molecules with a number average molecular weight greater than 2700 g/mol in the modified polyisocyanate is 4.1% by weight to 15% by weight, relative to the total weight of the modified polyisocyanate.

20. Use of the modified polyisocyanate according to any one of aspects 1-19 as a starting component in the preparation of polyurethanes.

21. Use of the modified polyisocyanate according to any one of aspects 1-19 as a crosslinking component for water-soluble or water-dispersible coating compositions, adhesives or sealants.

22. Use of the modified polyisocyanate according to any one of aspects 1-19 as a starting component for preparing polyisocyanates blocked by a blocking agent.

23. A coating composition, an adhesive or a sealant comprising the modified polyisocyanate according to any one of aspects 1-19.

24. A substrate coated with the coating composition, the adhesive or the sealant according to aspect 23.

25. Use of the modified polyisocyanate according to any one of aspects 1-19 for improving the manual stirring behavior of coating compositions, adhesives or sealants.

26. An aqueous two-component coating composition comprising: at least an aqueous hydroxy resin dispersion, at least a modified polyisocyanate according to any one of aspects 1-19, optionally an auxiliary agent and optionally an additive.

27. A method for preparing an aqueous two-component coating composition, comprising the steps of: mixing an aqueous hydroxy resin dispersion and optionally an additive in any manner to obtain a mixture, mixing the modified polyisocyanate according to any one of aspects 1-19 with the mixture, and manually stirring to obtain the aqueous two-component coating composition.

28. A product comprising a substrate and a coating formed by applying the aqueous two-component coating composition according to aspect 26 to the substrate.

29. The product according to aspect 28, wherein the substrate is made of wood, metal, alloy or inorganic material.

30. The product according to aspect 28, wherein the product is furniture.

31. A method for manufacturing a product, comprising applying the aqueous two-component coating composition according to aspect 26 to a substrate, and then curing and drying.

Unless defined otherwise, all technical and scientific terms used herein have the same meaning as commonly understood by those skill in the art. When the definition of a term in this specification conflicts with the meanings commonly understood by those skilled in the art, the definition described herein shall apply.

Unless indicated otherwise, all numbers expressing quantities of ingredients, reaction conditions and the like used in the specification and claims are to be understood as being modified by the term “about”. Accordingly, the numerical parameters set forth herein are approximations that can vary depending upon the desired properties to be obtained, unless indicated to the contrary.

Unless otherwise indicated, the wording“a”, “an”, and “the” used herein are intended to include “at least one” or “one or more”. For example, the wording “a component” refers to one or more components, therefore more than one component may be considered and may be adopted or used in the implementation of the described embodiments.

The wording “and/or” used herein refers to one or all of the cited elements.

The wording “include” and “comprise” used herein cover the presence of the mentioned elements alone and the presence of other elements not mentioned in addition to the mentioned elements.

EXAMPLES

All percentages in the present invention are weight percentages, unless otherwise stated.

The analysis and measurement in the present invention are performed at 23° C., unless otherwise stated.

The weight ratio of the iminooxadiazinedione structure to the isocyanurate structure in the polyisocyanate is determined by 13C NMR. The testing instrument is Bruker DPX-400. The weight ratio of iminooxadiazinedione structure:isocyanurate structure=1: (integrated area@148.4 ppm)/(integrated area@147.9 ppm+integrated area@144.5 ppm+integrated area@135.3 ppm). The molecular weight of the iminooxadiazinedione structure is identical to that of the isocyanurate structure.

The viscosity is measured with an MV-DIN rotor at 23° C. and at a shear rate of 10 $s^{-1}$ according to DIN EN ISO 3219: 1994-10.

The isocyanate group (NCO) content is determined according to DIN-EN ISO 11909:2007-05.

Standard for platinum-cobalt color value test: DIN-EN1557: 1997-03.

Standard for gloss test: GB/T 9754-2007.

Standard for haze test: ASTM E430-11.

Raw Materials and Agents

Polyisocyanate P1: A four-necked flask equipped with a stirrer, a thermometer, a reflux cooling tube, a nitrogen inlet pipe and a dropping funnel was set under nitrogen atmosphere. 850 g of hexamethylene diisocyanate (HDI) were added, and it was heated to 65° C. with stirring. Then 5.5 g of a catalyst trimethyl-2-methyl-2-hydroxyethylammonium hydroxide (solution diluted to 5% by weight with isobutanol) were added. Upon the NCO of the reaction solution being 38% by weight, 1.1 g of di-n-butyl phosphate was added to terminate the reaction. The unreacted monomers were removed by means of a thin film evaporator to obtain polyisocyanate P1 with 100% by weight of non-volatile ingredients, viscosity of 3000 mPa·s (23.5° C.), NCO content of 21.7% by weight, HDI monomer concentration of 0.25% by weight, and the weight ratio of the iminooxadiazinedione structure to the isocyanurate structure of 1:20.28.

Polyisocyanate P2: By using the method for preparing P1, the reaction was terminated upon the NCO content of the reaction solution being of 32%. The unreacted monomers were removed by a thin film evaporator to obtain polyisocyanate P2 with 100% by weight of non-volatile ingredients, viscosity of 16000 mPa·s (23.5° C.), NCO content of 20% by weight, HDI monomer concentration of 0.25% by weight, and the weight ratio of the iminooxadiazinedione structure to the isocyanurate structure of 1:27.57.

Polyisocyanate P3: By using the method for preparing P1 and using tetrabutylphosphonium fluoride solution (diluted to 50% with a mixture of isopropanol/methanol in a weight ratio of 2:1) as a catalyst, dibutyl phosphate was added to terminate the reaction, upon the NCO content of the reaction solution reaching 43%. The unreacted monomers were removed by means of a thin film evaporator to obtain polyisocyanate P3 with 100% by weight of non-volatile ingredients, viscosity of 700 mPa·s (23.5° C.), NCO content of 23.4% by weight, HDI monomer concentration of 0.25% by weight, and the weight ratio of the iminooxadiazinedione structure to the isocyanurate structure of 1:1.28.

Tetrabutylphosphonium fluoride solution: from Jinjinle Chemical Company.

Isopropanol: from Sigma-Aldrich.

Methanol: from Sigma-Aldrich.

3-cyclohexylaminopropane-1-sulfonic acid: from Sigma-Aldrich.

N,N-dimethylcyclohexylamine: from Sigma-Aldrich.

Trimethyl-2-methyl-2-hydroxyethylammonium hydroxide: Sigma-Aldrich.

Bayhydrol A 2470: aqueous hydroxy acrylate dispersion, from Covestro, Germany.

BYK 028: silicone defoamer (a mixture of defoaming polysiloxane and hydrophobic particles in polyethylene glycol), from BYK, Germany.

BYK 346: wetting and leveling agent (polyether-modified siloxane solution), from BYK, Germany.

BUTYL CELLOSOLVE: Cosolvent, ethylene glycol butyl ether, from Dow Chemical, USA.

RHEOVIS PU 1291: Hydrophobically modified ethoxylated polyurethane, rheology additive, associative thickener, from BASF, Germany.

Modified Polyisocyanate 1

60.35 g (0.287 eq) of polyisocyanate P2, 342 g (1.9 eq) of polyisocyanate P3, 11.30 g (0.051 eq) of 3-cyclohexylaminopropane-1-sulfonic acid and 6.680 g (0.053 mol) of dimethylcyclohexylamine were stirred at 80° C. for 4 hours under dry nitrogen. After cooling to room temperature, the modified polyisocyanate 1 of the present invention was obtained with the following characteristic data, which was a colorless and clear solution and had the following characteristics:

- Solid content: 100% by weight
- NCO content: 21.46% by weight
- Viscosity (23° C.): 2300 mPa·s
- Color value (Hazen): 31
- Sulfonate group content: 0.98% by weight
- Iminooxadiazinedione structure/isocyanurate structure: 1:2.12
- Number average molecular weight (Mn): 773 g/mol
- Molecular weight distribution: 1.31
- Total amount of molecules with a number average molecular weight Mn greater than 2700 g/mol: 4.15% by weight
- Ethylene oxide group content: 0.0% by weight.

Modified Polyisocyanate 2

225 g (1.154 eq) of polyisocyanate P1, 150 g (0.833 eq) of polyisocyanate P3, 14.80 g (0.067 eq) of 3-cyclohexylaminopropane-1-sulfonic acid and 8.60 g (0.068 mol) of dimethylcyclohexylamine were stirred at 80° C. for 4 hours under dry nitrogen. After cooling to room temperature, the modified polyisocyanate 2 of the present invention was obtained with the following characteristic data, which was a colorless and clear solution and had the following characteristics:

- Solid content: 100% by weight
- NCO content: 19.94% by weight
- Viscosity (23° C.): 7209 mPa·s
- Color value (Hazen): 16
- Sulfonate group content: 1.34% by weight
- Iminooxadiazinedione structure/isocyanurate structure: 1:4.15
- Number average molecular weight (Mn): 835 g/mol
- Molecular weight distribution: 1.32
- Total amount of molecules with a number average molecular weight Mn greater than 2700 g/mol: 5.51% by weight
- Ethylene oxide group content: 0.0% by weight.

Modified Polyisocyanate 3

133 g (0.633 eq) of polyisocyanate P2, 247 g (1.372 eq) of polyisocyanate P3, 10.76 g (0.049 eq) of 3-cyclohexylaminopropane-1-sulfonic acid and 6.3 g (0.050 mol) of dimethylcyclohexylamine were stirred at 80° C. for 4 hours under dry nitrogen. After cooling to room temperature, the modified polyisocyanate 3 of the present invention was obtained with the following characteristic data, which was a colorless and clear solution and had the following characteristics:

- Solid content: 100% by weight
- NCO content: 20.14% by weight
- Viscosity (23° C.): 5857 mPa·s
- Color value (Hazen): 25
- Sulfonate group content: 0.98% by weight
- Iminooxadiazinedione structure/isocyanurate structure: 1:2.3

Number average molecular weight (Mn): 870 g/mol
Molecular weight distribution: 1.50
Total amount of molecules with a number average molecular weight Mn greater than 2700 g/mol: 9.95% by weight
Ethylene oxide group content: 0.0% by weight.

Modified Polyisocyanate 4

200 g (1.026 eq) of polyisocyanate P2, 200 g (1.111 eq) of polyisocyanate P3, 11.3 g (0.051 eq) 3-cyclohexylaminopropane-1-sulfonic acid and 6.55 g (0.052 mol) of dimethylcyclohexylamine were stirred at 80° C. for 4 hours under dry nitrogen. After cooling to room temperature, the modified polyisocyanate 4 of the present invention was obtained with the following characteristic data, which was a colorless and clear solution and had the following characteristics:

Solid content: 100% by weight
NCO content: 20.42% by weight
Viscosity (23° C.): 7525 mPa·s
Color value (Hazen): 27
Sulfonate group content: 0.98% by weight
Iminooxadiazinedione structure/isocyanurate structure: 1:3.23
Number average molecular weight (Mn): 887 g/mol
Molecular weight distribution: 1.51
Total amount of molecules with a number average molecular weight Mn greater than 2700 g/mol: 10.14% by weight
Ethylene oxide group content: 0.0% by weight.

Modified Polyisocyanate 5

228 g (1.086 eq) of polyisocyanate P2, 152 g (0.8444 eq) of polyisocyanate P3, 10.76 g (0.09 eq) of 3-cyclohexylaminopropane-1-sulfonic acid and 6.3 g (0.050 mol) of dimethylcyclohexylamine were stirred at 80° C. for 4 hours under dry nitrogen. After cooling to room temperature, the modified polyisocyanate 5 of the present invention was obtained with the following characteristic data, which was a colorless and clear solution and had the following characteristics:

Solid content: 100% by weight
NCO content: 19.18% by weight
Viscosity (23° C.): 11340 mPa·s
Color value (Hazen): 22
Sulfonate group content: 0.98% by weight
Iminooxadiazinedione structure/isocyanurate structure: 1:4.1
Number average molecular weight (Mn): 939 g/mol
Molecular weight distribution: 1.64
Total amount of molecules with a number average molecular weight Mn greater than 2700 g/mol: 15.94% by weight
Ethylene oxide group content: 0.0% by weight.

Comparative Modified Polyisocyanate 1

400 g (2.222 eq) of polyisocyanate P3, 14.8 g (0.067 eq) of 3-cyclohexylaminopropane-1-sulfonic acid and 8.70 g (0.068 mol) of dimethylcyclohexylamine were stirred at 80° C. for 4 hours under dry nitrogen. After cooling to room temperature, the comparative modified polyisocyanate 1 was obtained with the following characteristic data, which was a colorless and clear solution and had the following characteristics:

Solid content: 100% by weight
NCO content: 21.46% by weight
Viscosity (23° C.): 1905 mPa·s
Color value (Hazen): 42
Sulfonate group content: 1.26% by weight
Iminooxadiazinedione structure/isocyanurate structure: 1:1.28
Number average molecular weight (Mn): 718 g/mol
Molecular weight distribution: 1.13
Total amount of molecules with a number average molecular weight Mn greater than 2700 g/mol: 0% by weight
Ethylene oxide group content: 0.0% by weight.

Comparative Modified Polyisocyanate 2

428.7 g (2.198 eq) of polyisocyanate P1, 285.12 g (1.584 eq) of polyisocyanate P3, 20.32 g (0.092 eq) of 3-cyclohexylaminopropane-1-sulfonic acid and 11.7 g (0.090 mol) of dimethylcyclohexylamine were stirred at 80° C. for 4 hours under dry nitrogen. After cooling to room temperature, the comparative modified polyisocyanate 2 was obtained with the following characteristic data, which was a colorless and clear solution and had the following characteristics:

Solid content: 100% by weight
NCO content: 20.9% by weight
Viscosity (23° C.): 3501 mPa·s
Color value (Hazen): 16
Sulfonate group content: 0.98% by weight
Iminooxadiazinedione structure/isocyanurate structure: 1:4.15
Number average molecular weight (Mn): 787 g/mol
Molecular weight distribution: 1.22
Total amount of molecules with a number average molecular weight Mn greater than 2700 g/mol: 2.61% by weight
Ethylene oxide group content: 0.0% by weight.

Comparative Modified Polyisocyanate 3

225 g (1.154 eq) of polyisocyanate P1, 150 g (0.833 eq) of polyisocyanate P3, 13.50 g (0.061 eq) of 3-cyclohexylaminopropane-1-sulfonic acid and 8.0 g (0.063 mol) of dimethylcyclohexylamine were stirred at 80° C. for 4 hours under dry nitrogen. After cooling to room temperature, the comparative modified polyisocyanate 3 was obtained with the following characteristic data, which was a colorless and clear solution and had the following characteristics:

Solid content: 100% by weight
NCO content: 20.3% by weight
Viscosity (23° C.): 5945 mPa·s
Color value (Hazen): 22
Sulfonate group content: 1.23% by weight
Iminooxadiazinedione structure/isocyanurate structure: 1:4.15
Number average molecular weight (Mn): 804 g/mol
Molecular weight distribution: 1.28
Total amount of molecules with a number average molecular weight Mn greater than 2700 g/mol: 3.97% by weight
Ethylene oxide group content: 0.0% by weight.

Comparative Modified Polyisocyanate 4

38 g (0.181 eq) of polyisocyanate P2, 342 g (1.922 eq) of polyisocyanate P3, 12.0 g (0.054 eq) of 3-cyclohexylaminopropane-1-sulfonic acid and 7.0 g (0.055 mol) dimethylcyclohexylamine were stirred at 80° C. for 4 hours under dry nitrogen. After cooling to room temperature, the comparative modified polyisocyanate 4 was obtained with the following characteristic data, which was a colorless and clear solution and had the following characteristics:

Solid content: 100% by weight
NCO content: 21.43% by weight
Viscosity (23° C.): 2137 mPa·s
Color value (Hazen): 16

Sulfonate group content: 1.08% by weight

Iminooxadiazinedione structure/isocyanurate structure: 1:1.51

Number average molecular weight (Mn): 738 g/mol

Molecular weight distribution: 1.19

Total amount of molecules with a number average molecular weight Mn greater than 2700 g/mol: 1.94% by weight Ethylene oxide group content: 0.0% by weight.

Comparative Modified Polyisocyanate 5

718 g (3.682 eq) of polyisocyanate P1, 24.0 g (0.108 eq) of 3-cyclohexylaminopropane-1-sulfonic acid and 14.0 g (0.110 mol) of dimethylcyclohexylamine were stirred at 80° C. for 4 hours under dry nitrogen. After cooling to room temperature, the comparative modified polyisocyanate 5 was obtained with the following characteristic data, which was a colorless and clear solution and had the following characteristics:

Solid content: 100% by weight

NCO content: 19.76% by weight

Viscosity (23° C.): 9361 mPa·s

Color value (Hazen): 18

Sulfonate group content: 1.15% by weight

Iminooxadiazinedione structure/isocyanurate structure: 1:20.27

Number average molecular weight (Mn): 866 g/mol

Molecular weight distribution: 1.33

Total amount of molecules with a number average molecular weight Mn greater than 2700 g/mol: 6.06% by weight Ethylene oxide group content: 0.0% by weight.

Comparative Modified Polyisocyanate 6

718 g (3.682 eq) of polyisocyanate P1, 12.6 g (0.057 eq) of 3-cyclohexylaminopropane-1-sulfonic acid and 7.6 g (0.060 mol) of dimethylcyclohexylamine were stirred at 80° C. for 4 hours under dry nitrogen. After cooling to room temperature, the comparative modified polyisocyanate 6 was obtained with the following characteristic data, which was a colorless and clear solution and had the following characteristics:

Solid content: 100% by weight

NCO content: 20.85% by weight

Viscosity (23° C.): 5296 mPa·s

Color value (Hazen): 14

Sulfonate group content: 0.61% by weight

Iminooxadiazinedione structure/isocyanurate structure: 1:20.27

Number average molecular weight (Mn): 855 g/mol

Molecular weight distribution: 1.31

Total amount of molecules with a number average molecular weight Mn greater than 2700 g/mol: 5.49% by weight Ethylene oxide group content: 0.0% by weight.

Method for Preparing the Aqueous Two-component Coating Compositions of the Examples and Comparative Examples Preparation of component A: According to the formula listed in Table 1, a defoamer, a leveling agent, a cosolvent, a rheological additive and water were added in sequence to the hydroxy acrylic resin or the hydroxy polyurethane resin. The mixture was dispersed at 1500 rpm for 20 minutes to obtain component A.

TABLE 1

Formula of component A

| Formula | Weight/g |
|---|---|
| Bayhydrol A2470 | 70 |
| BYK 028 | 0.5 |
| BYK 346 | 0.5 |
| BUTYL CELLOSOLVE | 2 |
| RHEOVIS PU 1291 | 1 |
| Deionized water | 26 |
| Total weight | 100 |

50 g of component A were mixed with the modified polyisocyanate of the present invention or the comparative modified polyisocyanate at a molar ratio of isocyanate groups to alcoholic hydroxyl groups of 1.5:1. The mixture was manually stirred for 30 seconds with a wooden stick to obtain the aqueous two-component coating compositions of the examples and comparative example.

Test Method for Water Dispersibility 7.5 g of water were added to the aqueous two-component coating composition. The mixture was stirred manually, and filtered with a 100 mesh filter, and visually observed for the residue on the filter. Less residue on the filter indicated a better dispersibility of the modified polyisocyanate in the resin system. According to the amount of the residue on the filter, the dispersibility of the modified polyisocyanate in the resin system was rated as 1-3, wherein score 1 means a large amount of residue on the filter; and score 2 means a detectable amount of residue on the filter; and score 3 means almost no residue on the filter. Thus, score 1 means the worst, and score 3 means the best.

Conditions for Gloss Test and Haze Test 7.5 g of water were added to the aqueous two-component coating composition. The mixture was stirred manually, and filtered with a 100 mesh filter. The filtered coating composition was applied onto a black plastic board with a wet film thickness of 120 microns. A coating layer was obtained after drying in the air, and the gloss and haze data thereof were tested.

Criteria for Evaluating the Gloss and the Haze gloss 60°>80, haze value<100, wherein a greater value of gloss 60° indicated higher gloss of the coating, and a greater haze value indicated worse transparency of the coating.

Table 2 shows the formulae and test results of the aqueous two-component coating compositions of examples 1-5 and comparative examples 1-6.

TABLE 2

| Formulae and test results of aqueous two-component coating compositions | | | | | | | | | | | |
|---|---|---|---|---|---|---|---|---|---|---|---|
| | Example 1 | Example 2 | Example 3 | Example 4 | Example 5 | Comparative Example 1 | Comparative Example 2 | Comparative Example 3 | Comparative Example 4 | Comparative Example 5 | Comparative Example 6 |
| Composition of the two-component coating composition | | | | | | | | | | | |
| | Component A | Component A | Component A | Component A | Component A | Component A | Component A | Component A | Component A | Component A | Component A |
| | Modified polyisocyanate 1 | Modified polyisocyanate 2 | Modified polyisocyanate 3 | Modified polyisocyanate 4 | Modified polyisocyanate 5 | Comparative modified polyisocyanate 1 | Comparative modified polyisocyanate 2 | Comparative modified polyisocyanate 3 | Comparative modified polyisocyanate 4 | Comparative modified polyisocyanate 5 | Comparative modified polyisocyanate 6 |
| Test Results | | | | | | | | | | | |
| Dispersibility | Score 3 | Score 3 | Score 3 | Score 3 | Score 3 | Score 2 | Score 1 | Score 2 | Score 2 | Score 1 | Score 2 |
| Wet film appearance | Normal | Normal | Normal | Normal | Slightly whitish | Normal | Normal | Normal | Normal | Normal | Slightly whitish |
| Gloss 60° | 91.8 | 91.3 | 91 | 91.3 | 80.3 | 90.7 | 91.1 | 91 | 91.1 | 91.5 | 71.8 |
| Haze value | 43.5 | 38.3 | 39 | 44.1 | 88.6 | 52.9 | 39.9 | 40.6 | 44.5 | 47 | 237 |

The aqueous two-component coating compositions of Examples 1-5 had good dispersibility, and the formed coatings had good gloss and transparency. The coatings formed by the aqueous two-component coating compositions of comparative examples 1-5 had good gloss and transparency, but poor dispersibility, indicating poor manual stirring behavior, which is disadvantageous for operating. The aqueous two-component coating composition of Example 6 had poor dispersibility, and thus the gloss and transparency of the coating therefrom were both poor.

Those skilled in the art will readily understand that the present invention is not limited to the foregoing details, and can be implemented in other specific forms without departing from the spirit or main characteristics of the present invention. Therefore, the examples should be regarded as illustrative rather than restrictive from any point of view, so that the scope of the present invention is illustrated by the claims rather than the foregoing description. Therefore, any change shall be regarded as belonging to the present invention, as long as it falls into the meaning and scope of equivalents of the claims.

The invention claimed is:

1. A modified polyisocyanate comprising an iminooxadiazinedione structure and an isocyanurate structure, wherein the weight ratio of the iminooxadiazinedione structure to the isocyanurate structure is not less than 1:5; and the total amount of molecules with a number average molecular weight greater than 2700 g/mol in the modified polyisocyanate is 4.1% by weight to 22% by weight, relative to the total weight of the modified polyisocyanate; and the modified polyisocyanate comprises a reaction product of:

a. at least an aminosulfonic acid;

b. at least a polyisocyanate;

c. at least a tertiary amine; and d. optionally, a polyether alcohol containing ethylene oxide groups.

2. The modified polyisocyanate according to claim 1, wherein the molecular weight distribution of the modified polyisocyanate is in a range of 1.2-2.0.

3. The modified polyisocyanate according to claim 1, wherein the weight ratio of the iminooxadiazinedione structure to the isocyanurate structure in the modified polyisocyanate is 1:5-1:1.

4. The modified polyisocyanate according to claim 1, wherein the total amount of molecules with a number average molecular weight greater than 2700 g/mol in the modified polyisocyanate is 4.1% by weight to 20% by weight, relative to the total weight of the modified polyisocyanate.

5. The modified polyisocyanate according to claim 1, wherein the amount of sulfonate groups in the modified polyisocyanate is 0.1% by weight to 7% by weight, relative to the total weight of the modified polyisocyanate.

6. The modified polyisocyanate according to claim 1, wherein the viscosity of the modified polyisocyanate is greater than 2250 mPa·s and not more than 30000 mPa·s, measured with the modified polyisocyanate in the absence of solvent according to DIN EN ISO 3219:1994-10 at 23° C. and at a shear rate of 10 $s^{-1}$.

7. The modified polyisocyanate according to claim 1, wherein the number average molecular weight of the modified polyisocyanate is 700 g/mol-1500 g/mol, measured according to gel permeation chromatography and DIN 55672-1:2016-03 with polystyrene as standard and tetrahydrofuran as eluent.

8. The modified polyisocyanate according to claim 1, wherein the isocyanate group content in the modified polyisocyanate is 7% by weight to 23% by weight, relative to the total weight of the modified polyisocyanate.

9. The modified polyisocyanate according to claim 1, wherein the aminosulfonic acid is of formula I:

I

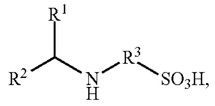

wherein, $R^1$ and $R^2$ are each independently hydrogen, a substituted or unsubstituted and/or heteroatom-containing aliphatic group with 1-18 carbon atoms, a substituted or unsubstituted and/or heteroatom-containing alicyclic group with 3-18 carbon atoms, a substituted or unsubstituted and/or heteroatom-containing aromatic group with 1-18 carbon atoms; or $R^1$ reacts with $R^2$ to form an alicyclic group with 3-8 carbon atoms or a heterocyclic group substituted by an oxygen atom or a nitrogen atom with 3-8 carbon atoms; $R^3$ is a linear or branched aliphatic group with 2-8 carbon atoms.

10. The modified polyisocyanate according to claim 1, wherein the amount of aminosulfonic acid is 1.5% by weight to 3.5% by weight, relative to the total weight of component a) and component b).

11. The modified polyisocyanate according to claim 1, wherein the polyisocyanate comprises an iminooxadiazinedione structure and an isocyanurate structure, and the weight ratio of the iminooxadiazinedione structure to the isocyanurate structure is greater than 1:5 and not more than 1:1.

12. The modified polyisocyanate according to claim 1, wherein the polyisocyanate comprises at least two diisocyanates and/or is one or more of aliphatic polyisocyanates and alicyclic polyisocyanates.

13. A coating composition, an adhesive or a sealant comprising the modified polyisocyanate according to claim 1.

14. A product comprising a substrate and a coating formed by applying an aqueous two-component coating composition comprising: at least an aqueous hydroxy resin dispersion, at least the modified polyisocyanate according to claim 1, optionally an auxiliary agent and optionally an additive to the substrate.

15. The modified polyisocyanate according to claim 12, wherein the polyisocyanate comprises one or more of hexamethylene diisocyanate derivatives with an isocyanurate structure and an iminooxadiazinedione structure, and pentamethylene diisocyanate derivatives with an isocyanurate structure and an iminooxadiazinedione structure.

* * * * *